United States Patent [19]
Zander

[11] Patent Number: 6,047,128
[45] Date of Patent: Apr. 4, 2000

[54] SYSTEM FOR DOWNLOADING SOFTWARE

[75] Inventor: Wolfgang Zander, Weiterstadt, Germany

[73] Assignee: U.S. Philips Corporation, New York, N.Y.

[21] Appl. No.: 08/987,696

[22] Filed: Dec. 9, 1997

[30] Foreign Application Priority Data

Dec. 18, 1996 [DE] Germany .......................... 196 52 629

[51] Int. Cl.⁷ ...................................................... G06F 9/44
[52] U.S. Cl. ............................................................. 395/712
[58] Field of Search ............................................. 395/712

[56] References Cited

U.S. PATENT DOCUMENTS

| | | | |
|---|---|---|---|
| 5,307,261 | 4/1994 | Maki et al. ................................ | 705/29 |
| 5,311,424 | 5/1994 | Mukherjee et al. ....................... | 705/29 |
| 5,410,703 | 4/1995 | Nilsson et al. ........................... | 395/712 |
| 5,499,357 | 3/1996 | Sonty et al. .............................. | 395/500 |
| 5,555,418 | 9/1996 | Nilsson et al. ........................... | 395/685 |
| 5,812,849 | 9/1998 | Nykiel et al. ............................. | 395/701 |
| 5,835,911 | 11/1998 | Nakagawa et al. ..................... | 707/203 |

OTHER PUBLICATIONS

Continuus ObjectMake Guide Continuus Software Corporation pp. 67–85, 1996.

Code Complete Steve Mc Connell 1993 pp. 527–536.

Unix Shell Programming L.J. Aurthur et al. 1994 pp. 302–309, 316–325, 357, 360–364, 377.

A Gentle Introduction to the VAX System J.R. Hubbard 1987 pp. 29–39, 115–117.

*Primary Examiner*—Tariq R. Hafiz
*Assistant Examiner*—T. Ingberg
*Attorney, Agent, or Firm*—Peter Verdonk

[57] ABSTRACT

The invention relates to a system for downloading software with a module, which includes a control circuit and a storage device for storing software, and with a loading device for delivering software to the module whose control circuit is arranged to download software to be stored in the storage device in response to an appropriate instruction. The software comprises system software, at least consisting of operating system software and downloading software, and application software for controlling at least one component coupled to the module. A first part of the storage device is arranged to store the system software and a second part of the storage device is arranged to store the application software. During the downloading of system software, the control circuit is arranged to erase the first part of the storage device, after storage of the new system software in the second part of the storage device, and to transfer subsequently the new system software from the second to the first part of the storage device.

7 Claims, 1 Drawing Sheet

SYSTEM FOR DOWNLOADING SOFTWARE

BACKGROUND OF THE INVENTION

The invention relates to a system for downloading software with a module which includes a control circuit and a storage device for storing software, and with a loading device for delivering software to the module whose control circuit is arranged to download software, to be stored in the storage device, after reception of an appropriate instruction.

A system of this kind is known from DE 43 33 272 A1 and includes a terminal apparatus which is coupled to a network and also a maintenance device. The maintenance device transmits new operating software for a control circuit of the terminal apparatus via the network, said software being downloaded into the terminal apparatus by means of a downloading control unit which is included in the control circuit. For the downloading operation the downloading control unit utilizes downloading software which is stored in a downloading memory. The operating software is stored in another memory which is referred to as the operating memory. This communication system requires a separate memory (downloading memory) and a separate control unit (downloading control unit) for the downloading operation.

SUMMARY OF THE INVENTION

It is an object of the invention to provide a system which requires fewer circuit means for the downloading of software into a module.

This object is achieved in a system of the kind set forth in that the software comprises system software, at least consisting of operating system software and downloading software, and application software for controlling at least one component coupled to the module, (that a first part of the storage device is arranged to store the system software and a second part of the storage device is arranged to store the application software, (and that during the downloading of system software the control circuit is arranged to erase the first part of the storage device, after the storage of the new system software in the second part of the storage device, and to transfer subsequently the new system software from the second part to the first part of the storage device.

In the system according to the invention, the control circuit in the module performs the replacing of the system software stored in a storage device. The storage device may consist of a plurality of non-volatile memories or be constructed as a Flash EEPROM with a plurality of individually erasable and rewritable parts. The system could comprise a plurality of modules, constructed as computer modules, for at least one video technical apparatus, said modules being coupled to the loading device, constructed as a personal computer, via network connections (for example, Thinwire-Ethernet). Such a video technical apparatus could be, for example a film scanner, mixer or other studio equipment.

The invention is based on the idea to split the software into two parts and to store these parts in different parts of the storage device. The system software is then refreshed in such a manner that the new system software received from the loading device is first stored in the part of the storage device in which the other part of the software, being the application software, is stored. The application software is then overwritten by the new system software. After the transfer of the new system software, the old system software is erased and the new system software is transferred to the first part of the storage device. The erasure of the old system software and the storage or programming of the new system software are performed by means of a utility program. The control circuit then fetches the utility program from the storage device and instructs it to perform the erasure and programming operation.

After successful transfer of the new system software, the loading device can be supplied with an appropriate message so that it can subsequently supply application software. After an instruction for the downloading of application software from the loading device, the control circuit erases the old application software and programs the new application software supplied by the loading device.

The invention also relates to a method of downloading software and to a module in the system for the downloading of software.

BRIEF DESCRIPTION OF THE DRAWINGS

An embodiment of the invention will be described in detail hereinafter with reference to the drawing. Therein.

DESCRIPTION OF THE PREFERRED EMBODIMENTS

Figure 1:
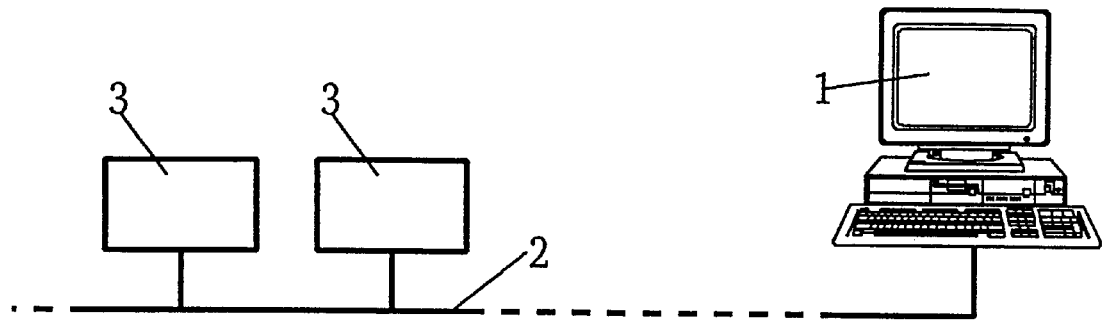
FIG. 1 shows diagrammatically a system comprising two modules, network connections and a loading device.

FIG. 1 shows diagrammatically a system for the replacing of software which is stored in non-volatile memories (Flash EEPROM) and serves to control a film scanner. For example, new software is supplied, by a loading device 1, for example being a personal computer (PC), to one or more computer modules 3 of the film scanner, via network connections 2 (for example, Thinwire Ethernet).

Figure 2:
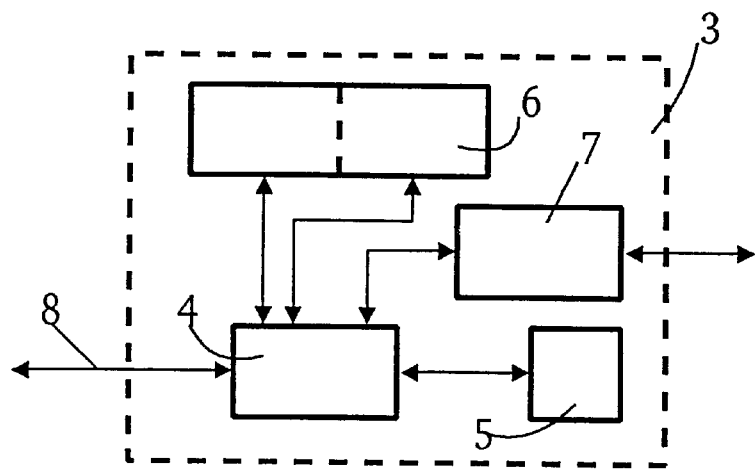
FIG. 2 shows a block diagram of a module.

Such a computer module 3 serves to control components of the film scanner and may have a construction as shown in FIG. 2. It includes a control circuit 4 which is constructed, for example as a microprocessor, a main memory 5 (RAM), a non-volatile memory 6, and a network interface 7. The non-volatile memory 6 comprises at least two sectors or parts which can be individually erased and rewritten. The control circuit communicates with the other components of the film scanner, for example via a bus system which is represented by a connection 8 in FIG. 2. The network interface 7 exchanges data between the network connections 2 and the control circuit 4. The control module 3 also comprises connections between the control circuit 4 and the respective sectors of the memory 6 and the main memory 5.

The software stored in the memory 6 consists of two parts. The first part of the software is referred to as system software and incorporates the operating system, diagnostic software, network driver software, erasure and programming software for the nonvolatile memory (Flash EEPROM) and the software for the downloading operation. The second software part is referred to as application software and concerns the software for the relevant applications of the film scanner. The system software is stored in a first part of the memory 6 and the application software is stored in a second part of the memory 6. Both parts of the memory 6 can be individually erased and rewritten (different address spaces).

After a system start, the control circuit 4 first loads the system software and subsequently tests whether application software has been loaded. If the application software has been loaded into the second part of the memory 6, it is called, initialized and subsequently executed. In the other case, i.e. when the application software has not been loaded, the control circuit 4 inhibits requests for the application software. Because the application software has not been loaded, the control circuit 4 operates in a mode without special control functions dictated by the system software. This mode occurs, for example after the putting into operation of a computer module, when the system software has been loaded into the first part of the memory 6 beforehand, for example by means of a programmer (EEPROM programmer). The application software can then be written into the second part of the memory 6 by means of the personal computer 1, via the network connections.

The loading or downloading operation for application software, performed by the control circuit 4 in conformity with the software for the downloading operation which is stored in the first part of the memory 6, is executed as follows:

1. instruction from the loading device 1 to load new application software;
2. inhibiting the access to all old application software;
3. erasing the old application software in the memory 6;
4. loading a data block of the new application software into the main memory;
5. reading the data block from the main memory 5, decoding it and programming it at the corresponding addresses of the memory 6;
6. has the last data block been received from the loading device 1?
   Yes: continue with point 7;
   No: continue as from point 4;
7. executing a restart.

After the control circuit 4 has received, via the network connections 2 and the network interface 7, the instruction from the loading device 1 that new application software must be loaded into the second part of the memory 6, all accesses to the old application software are inhibited. This means that all current application programs are terminated and no further application programs can be called. Subsequently, the old application software in the second part of the memory 6 is erased (given address space in the Flash EEPROM is erased). The data blocks of the new application software are successively received by the control circuit 4, buffered in the main memory 5 and programmed at the corresponding addresses of the memory 6 after decoding. This operation is continued until all data blocks of the new application software have been transferred. Finally, the control circuit 4 dictates a restart so that the new application software is activated and takes over the control of components of the film scanner.

The loading or downloading operation for system software, performed by the control circuit 4 in conformity with the software for the downloading operation which is stored in the first part of the memory 6, is executed as follows:

1. instruction from the loading device 1 to load new system software;
2. inhibiting the access to old application software;
3. erasing the old application software in the memory 6;
4. loading a data block of the new system software into the main memory;
5. reading the data block from the main memory 5, decoding it and programming it at the corresponding addresses of the second part of the memory 6;
6. has the last data block been received from the loading device 1?
   Yes: continue with point 7;
   No: continue as from point 4;
7. reading a utility program from the second part of the memory 6 so as to copy it in the main memory 5;
8. calling the utility program;
9. erasing the old system software in the first part of the memory 6;
10. copying the new system software from the second part into the first part of the memory 6;
11. erasing the system software in the second part of the memory 6;
12. executing a restart;
13. loading new application software.

If the system software is to be downloaded, the loading device 1 applies an instruction to a computer module 3 via the network connections 2. After reception of the instruction, the control circuit 4 inhibits all accesses to the application software and erases the second part of the memory 6. As in the case of the downloading operation for the application software, data blocks of the new system software are successively received from the control circuit 4, via the network interface 7, so as to be stored in the main memory 5 and, after decoding, programmed at the corresponding addresses of the second part of the memory 6. This operation is continued until all data blocks of the new system software have been stored in the second part of the memory 6. After the new system software has been completely stored in the second part of the memory 6, the control circuit 4 fetches a utility program from the new system software, said utility program being stored in the main memory 5. After the utility program has been called, the old system software in the first part of the memory is erased by means of the utility program and the new software is copied from the second part into the first part of the memory 6, again by means of the utility program. Subsequently, the control circuit 4 performs a restart so that the new system software is activated. Because no application software is present in the second part of the memory 6, the control circuit 4 operates in a mode without special control functions. It is only after new application software has been supplied by the loading device 1 in conformity with the routine described above that the control circuit 4 can take over the control of components of the film scanner again.

I claim:

1. A system for downloading new software, the system having a module which includes a control circuit and a storage device for storing the new software, and the system having a loading device for delivering the new software to the module whose control circuit is arranged to store the new software in the storage device, after reception of an appropriate instruction, wherein the new software comprises system software, at least consisting of operating software and downloading software, and also comprises new application software for controlling at least one component coupled to the module, wherein during operational use of the at least one component a first part of the storage device is arranged to store the new system software and a second part of the storage device is arranged to store the new application software, and wherein during the downloading of the new system software the control circuit is arranged to erase the first part of the storage device, after the storage of the new system software in the second part of the storage device, and to transfer subsequently the new system software from the second part to the first part of the storage device.

2. A system as claimed in claim 1, wherein after the storage of the new system software, the control circuit is arranged to fetch a utility program from the storage device in order to erase old system software in the first part of the storage device and to program the new system software in the first part of the storage device.

3. A system as claimed in claim 1, wherein after an instruction for the downloading of the new application software from the loading device the control circuit is arranged to erase the software in the second part of the storage device and to program the new application delivered by the loading device in the second part storage device.

4. A system as claimed in claim 1, wherein storage device is constructed as a Flash EEPROM comprising a plurality of parts which can be individually erased and rewritten.

5. A system as claimed in claim 1, characterized in that the system comprises a plurality of modules which are constructed as computer components for at least one video technical apparatus, said components being coupled to the loading device, constructed as a personal computer, via network connections.

6. A method for downloading new software using a module, which includes a control circuit and a storage device for storing the new software, and using a loading device for delivering the new software to the module whose control circuit is arranged to download the new software, to be stored in the storage device, after reception of an appropriate instruction, wherein the new software comprises system software, at least consisting of operating system software and downloading software, and application software for controlling at least one component coupled to the module, wherein during operational use of the at least one component the system software is stored in the first part of the storage device and the application software is stored in the second part of the storage device, and wherein during the downloading first the new system software is stored in the second part of the storage device, after which the first part of the storage device is erased and the new system software is transferred from the second part to the first part of the storage device.

7. A module for use in a system for downloading new software, wherein the module includes a control circuit and a storage device for the software, the module being capable of receiving the new software from a loading device, and the circuit is arranged to download software to be stored in the storage device after reception of an appropriate instruction, wherein the new software comprises system software, at least consisting of operating system software and downloading software, and application software for controlling at least one component coupled to the module, wherein during operational use of the at least one component a first part of the storage device is arranged to store the system software and a second part of the storage device is arranged to store the application software, and wherein during the downloading of system software the control circuit is arranged to erase the first part of the storage device, after the storage of the new system software in the second part of the storage device, and to transfer subsequently the new system software from the second part to the first part of the storage device.

* * * * *